United States Patent
Yang

(10) Patent No.: US 7,486,528 B2
(45) Date of Patent: *Feb. 3, 2009

(54) LINEAR-PREDICT SAMPLING FOR MEASURING DEMAGNETIZED VOLTAGE OF TRANSFORMER

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 288 days.

This patent is subject to a terminal disclaimer.

(21) Appl. No.: 11/464,702

(22) Filed: Aug. 15, 2006

(65) Prior Publication Data

US 2008/0043496 A1 Feb. 21, 2008

(51) Int. Cl.
*H02M 3/335* (2006.01)
*H02M 7/44* (2006.01)
*H02M 7/68* (2006.01)

(52) U.S. Cl. .............. 363/21.12; 363/21.17; 363/21.18; 363/21.13; 363/97; 363/131

(58) Field of Classification Search .............. 363/21.12, 363/21.16, 21.17, 21.18, 21.13, 97, 131
See application file for complete search history.

(56) References Cited

U.S. PATENT DOCUMENTS

| | | | |
|---|---|---|---|
| 4,302,803 A | 11/1981 | Shelly | |
| 5,901,051 A * | 5/1999 | Takahashi et al. | 363/21.18 |
| 6,853,563 B1 | 2/2005 | Yang et al. | |
| 7,016,204 B2 * | 3/2006 | Yang et al. | 363/21.13 |
| 7,054,170 B2 * | 5/2006 | Yang et al. | 363/21.18 |
| 7,061,780 B2 * | 6/2006 | Yang et al. | 363/21.16 |
| 7,259,972 B2 * | 8/2007 | Yang | 363/21.16 |
| 7,349,229 B1 * | 3/2008 | Yang | 363/21.16 |
| 7,352,595 B2 * | 4/2008 | Yang et al. | 363/21.13 |
| 7,362,592 B2 * | 4/2008 | Yang et al. | 363/21.13 |
| 7,362,593 B2 * | 4/2008 | Yang et al. | 363/21.16 |

* cited by examiner

*Primary Examiner*—Bao Q Vu
(74) *Attorney, Agent, or Firm*—J.C. Patents

(57) ABSTRACT

A linear-predict sampling circuit is developed to generate a feedback signal by detecting a demagnetized voltage of the transformer. A switching signal is generated in response to the feedback signal for regulating the output of the power converter. A signal-generation circuit is used to generate a sample signal in response to a first signal, a second signal, and the switching signal. The first signal is correlated to a magnetized voltage of the transformer. The second signal is correlated to the demagnetized voltage of the transformer. A sample-and-hold circuit is coupled to the transformer to generate the feedback signal by sampling the demagnetized voltage of the transformer in response to the sample signal. The feedback signal is correlated to the output voltage of the power converter.

15 Claims, 4 Drawing Sheets

LINEAR-PREDICT SAMPLING FOR MEASURING DEMAGNETIZED VOLTAGE OF TRANSFORMER

BACKGROUND OF THE INVENTION

1. Field of the Invention

The present invention relates to a power converter, and more specifically relates to a control circuit of a switching power converter.

2. Description of Related Art

Power supplies have been widely used to provide regulated output voltages. For the sake of safety, an off-line power supply must provide isolation between its primary side and secondary side. An optical-coupler and a secondary-side regulator are needed to regulate the output voltage of the off-line power supply. In order to reduce the device count and the secondary-side feedback circuit, the demagnetized voltage of the transformer had been utilized to regulate the output voltage of the power supply, such as described in "Rectifier-converter power supply with multi-channel flyback inverter", by Randolph D. W. Shelly, in U.S. Pat. No. 4,302,803. However, the skill of the aforementioned prior art cannot measure an accurate voltage signal from the transformer. Therefore, a poorer regulation of the power converter is resulted. In recent developments, many primary-side control techniques have been developed to provide a precise voltage measurement of the transformer, such as the "Primary-side controlled flyback power converter" by Yang, et al, U.S. Pat. No. 6,853,563; "Close-loop PWM controller for primary-side controlled power converters" by Yang, et al, U.S. Pat. No. 7,016,204. But the detection circuits of the aforementioned prior arts are too complicated, which increases the cost of the power supply. These shortcomings are the main objects of the present invention to overcome.

SUMMARY OF THE INVENTION

An object of the present invention is to provide a simpler and more precise sampling circuit to measure a demagnetized voltage of the transformer. The demagnetized voltage is utilized to generate a feedback signal for the power converter. A switching signal is generated in response to the feedback signal for regulating the output of the power converter. A signal-generation circuit is used to generate a sample signal in response to a first signal, a second signal, and the switching signal. The first signal is correlated to a magnetized voltage of the transformer. The second signal is correlated to the demagnetized voltage of the transformer. A sample-and-hold circuit is coupled to the transformer to generate the feedback signal by sampling the demagnetized voltage of the transformer in response to the sample signal. The feedback signal is thus correlated to the output voltage of the power converter.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE PREFERRED EMBODIMENTS

Figure 1:
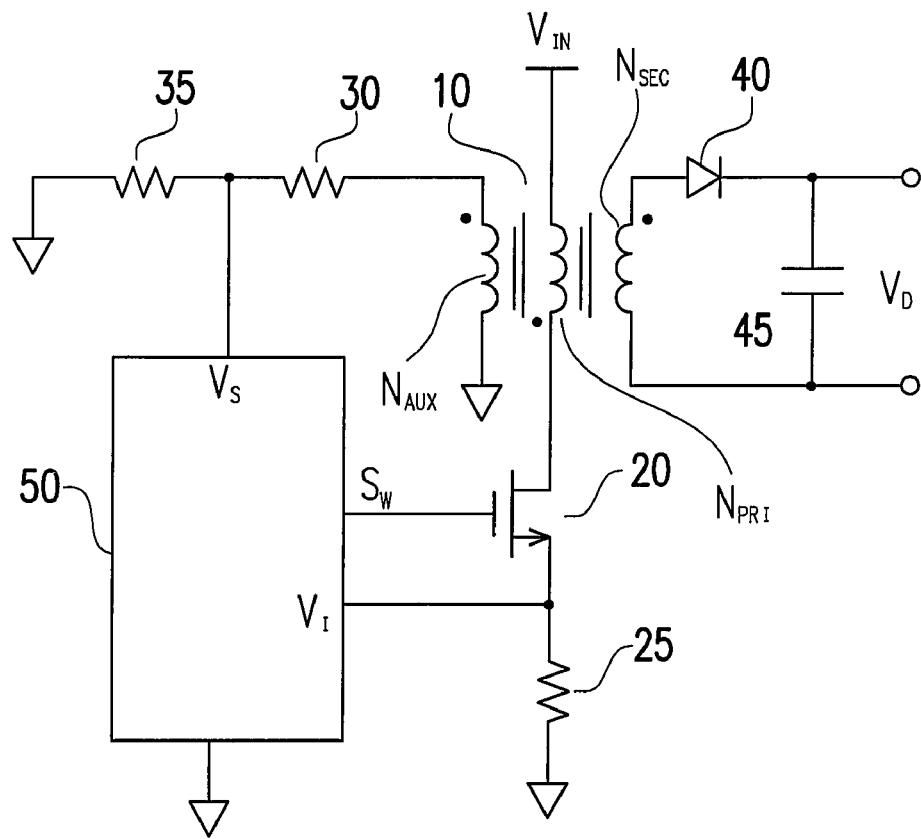
FIG. 1 shows a schematic diagram of a power converter, according to a preferred embodiment of the present invention.

FIG. 1 shows a switching power converter, according to a preferred embodiment of the present invention, comprising a transformer 10 having an auxiliary winding $N_{AUX}$, a primary winding $N_{PR1}$, and a secondary winding $N_{SEC}$. The primary winding $N_{PR1}$ is coupled to an input voltage $V_{IN}$. The secondary winding $N_{SEC}$ generates an output voltage $V_O$ via a rectifier 40 and a capacitor 45. In order to regulate the output voltage $V_O$, a switching control circuit 50 generates a switching signal $S_W$ to switch the transformer 10 via a transistor 20. When the transistor 20 is turned on, a magnetized voltage, which is equivalent to the input voltage $V_{IN}$, is applied to the transformer 10. A charge current is therefore flowed through the primary winding $N_{PR1}$ of the transformer 10 and the transistor 20. Through a resistive device 25, the charge current is converted to a current signal coupled to a VI terminal of the switching control circuit 50. The energy stored into the transformer 10 during a magnetized period is delivered to the secondary winding $N_{SEC}$ and the auxiliary winding $N_{AUX}$ once the switch 20 is turned off. If the forward voltage of the rectifier 40 can be neglected, a demagnetized voltage of the auxiliary winding $V_{AUX}$ can be expressed as, $$V_{AUX} = \frac{N_A}{N_S} \times V_O \quad (1)$$

where $N_A$ and $N_S$ are the winding turns of the auxiliary winding $N_{AUX}$ and the secondary winding $N_{SEC}$ of the transformer 10, respectively.

A voltage divider formed by a plurality of resistors 30 and 35 is connected to a VS terminal of the switching control circuit 50 for detecting the voltage of the auxiliary winding $N_{AUX}$ of the transformer 10. The voltage detected at the VS terminal of the switching control circuit 50, $V_S$, can be shown as, $$V_S = \frac{R_{35}}{R_{30} + R_{35}} \times V_{AUX} \quad (2)$$

where $R_{30}$ and $R_{35}$ are the resistance of the resistors 30 and 35, respectively.

In order to more precisely detect the output voltage $V_O$ of the power converter, the demagnetized voltage should be measured after the switching current of the secondary winding $N_{SEC}$ which is reduced to zero. Therefore, the variation of the forward voltage of the rectifier 40 can be neglected. The charge current is flowed through the transformer 10 when the magnetized voltage ($V_{IN}$) is applied to the transformer 10. A discharge current is produced according to the demagnetized voltage ($V_O$) across the secondary winding $N_{SEC}$ of the transformer 10 during the demagnetization period. The discharge current represents the switching current of the secondary winding $N_{SEC}$ of the transformer 10. The discharge current will be reduced to zero at the end of the demagnetization period. Therefore, the voltage of the transformer should be sampled at the end of the demagnetization period. The charge current, $I_C$ and the discharge current, $I_D$, can be shown as, $$I_C = \frac{V_{IN}}{L_P} \times T_{CHARGE} \quad (3)$$

$$I_D = \frac{V_O}{L_S} \times T_{DISCHARGE} \quad (4)$$

where $L_P$ and $L_S$ are the inductances of the primary winding $N_{PRI}$ and the secondary winding $N_{SEC}$ of the transformer 10, respectively. $T_{CHARGE}$ is the magnetization period; $T_{DISCHARGE}$ is the demagnetization period.

The magnetized flux $\Phi_C$ of the transformer is equal to the demagnetized flux $\Phi_D$. The equality is shown as, $$\Phi_C = \Phi_D \quad (5)$$

$$\Phi = B \times Ae = \frac{V \times T}{N} \quad (6)$$

$$\frac{V_{IN}}{N_P} \times T_{CHARGE} = \frac{V_O}{N_S} \times T_{DISCHARGE} \quad (7)$$

$$V_{IN} \times T_{CHARGE} = \frac{N_P}{N_S} \times V_O \times T_{DISCHARGE} \quad (8)$$

where B is the flux density, Ae is the cross-section area of the transformer, T is the magnetization period or the demagnetization period of the transformer, and N is the winding turns of the transformer;

The demagnetization period $T_{DISCHARGE}$ of the transformer 10 can be obtained in accordance with the equation (8).

$$T_{DISCHARGE} = \frac{N_S}{N_P} \times \frac{V_{IN}}{V_O} \times T_{CHARGE} \quad (9)$$

The equation (9) above shows that the demagnetization period $T_{DISCHARGE}$ can be predicted according to the magnetized voltage $V_{IN}$, the demagnetized voltage $V_O$ and the magnetization period $T_{CHARGE}$. The magnetization period $T_{CHARGE}$ is corresponded to the enable time of the switching signal $S_W$.

Figure 2:
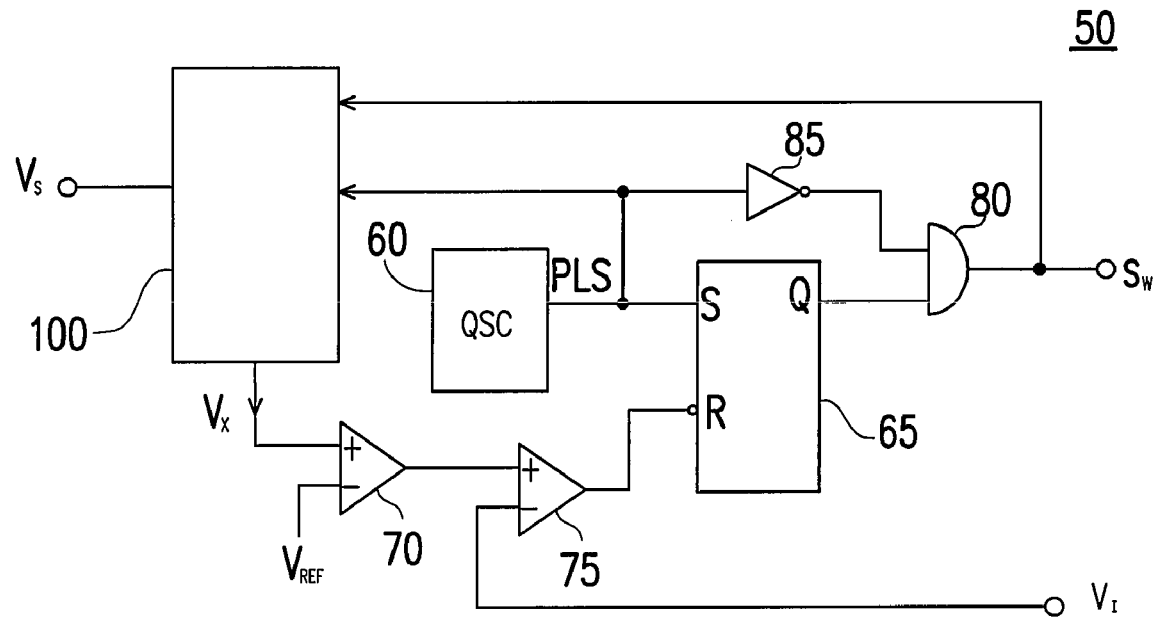
FIG. 2 shows a switching control circuit of the power converter, according to the preferred embodiment of the present invention.

FIG. 2 shows the switching control circuit 50. The switching control circuit 50 includes a linear-predict sampling circuit 100 coupled to the VS terminal to generate a feedback signal $V_X$ according to the voltage detected from the transform 10. The feedback signal $V_X$ is coupled to an error amplifier 70. The error amplifier 70 includes a reference voltage $V_{REF}$. An oscillation circuit 60 generates a pulse signal PLS to enable a flip-flop 65 periodically. The output of the flip-flop 65 is connected to an input of an AND gate 80 for generating the switching signal $S_W$. Another input of the AND gate is connected to the pulse signal PLS through an inverter 85. The output of the error amplifier 70 is connected to an input of a comparator 75. Another input of the comparator 75 is coupled to the VI terminal to receive the current signal. The output of the comparator 75 is coupled to reset the flip-flop 65. Therefore, the switching signal $S_W$ is generated in response to the feedback signal $V_X$.

Figure 3:
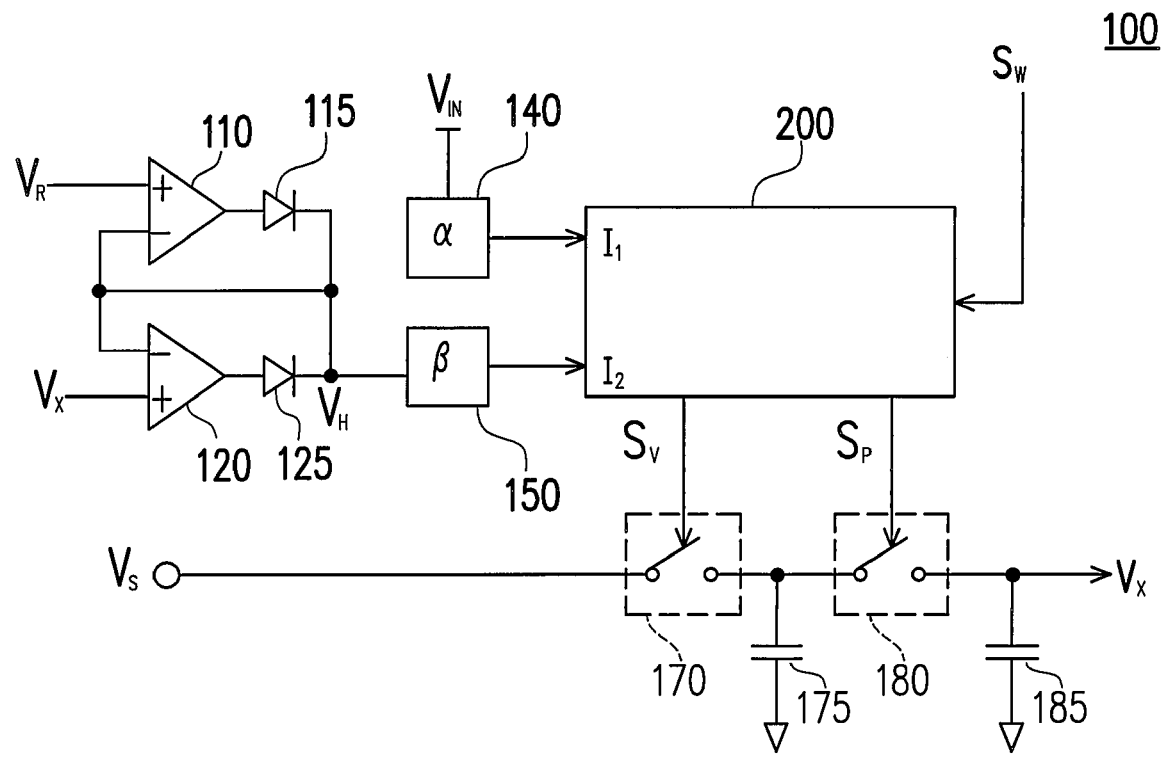
FIG. 3 shows a preferred embodiment of a linear-predict sampling circuit according to the present invention.

FIG. 3 shows the linear-predict sampling circuit 100. A signal-generation circuit 200 is utilized to generate a sample signal $S_V$ in response to a first signal $I_1$, a second signal $I_2$ and the switching signal $S_W$. Furthermore, a strobe signal $S_P$ is generated by the signal-generation circuit 200 in response to the end of the sample signal $S_V$. Through a conversion circuit 140, the first signal $I_1$ is generated in accordance with the input voltage $V_{IN}$. The input voltage $V_{IN}$ is equal to the magnetized voltage of the transformer 10 according to the preferred embodiment shown in FIG. 1. Therefore the magnitude of the first signal $I_1$ is correlated to the magnetized voltage of the transformer 10. A conversion circuit 150 produces the second signal $I_2$ in response to a signal $V_H$. The signal $V_H$ is determined by the feedback signal $V_X$ or a reference signal $V_R$. An operational amplifier 110 and a diode 115 form a first buffer supplied by the reference signal $V_R$. An operational amplifier 120 and a diode 125 form a second buffer supplied by the feedback signal $V_X$. The output of the first buffer and the output of the second buffer are tied together to generate the signal $V_H$. The reference signal $V_R$ clamps the minimum value of the signal $V_H$. The minimum value of the second signal $I_2$ is therefore clamped to a limit value determined by the reference signal $V_R$. The feedback signal $V_X$ is generated according to the sampling of the demagnetized voltage ($V_O$) of the transformer 10 in FIG. 1. Therefore, the second signal $I_2$ is correlated to the demagnetized voltage ($V_O$) of the transformer 10. A plurality of switches 170, 180 and capacitors 175, 185 develop a sample-and-hold circuit. The switch 170 is controlled by the sample signal $S_V$. The switch 180 is controlled by the strobe signal $S_P$. The capacitor 185 is utilized to generate the feedback signal $V_X$. The switch 170 is coupled to the transformer 10 through the VS terminal to sample the demagnetized voltage of the transformer 10 to the capacitor 175. The switch 180 is coupled to the capacitor 175 to sample the voltage of the capacitor 175 to the capacitor 185 in response to the strobe signal $S_P$. Therefore, the sample-and-hold circuit is coupled to the transformer 10 to generate a feedback signal $V_X$ by sampling the demagnetized voltage of the transformer 10 in response to the sample signal $S_V$. The demagnetized voltage is corresponded to the output voltage $V_O$ of the power converter. Therefore, the feedback signal $V_X$ is correlated to the output voltage $V_O$ of the power converter. The switching signal $S_W$ is further generated in response to the feedback signal $V_X$ for switching the transformer 10 and regulating the output of the power converter.

Figure 4:
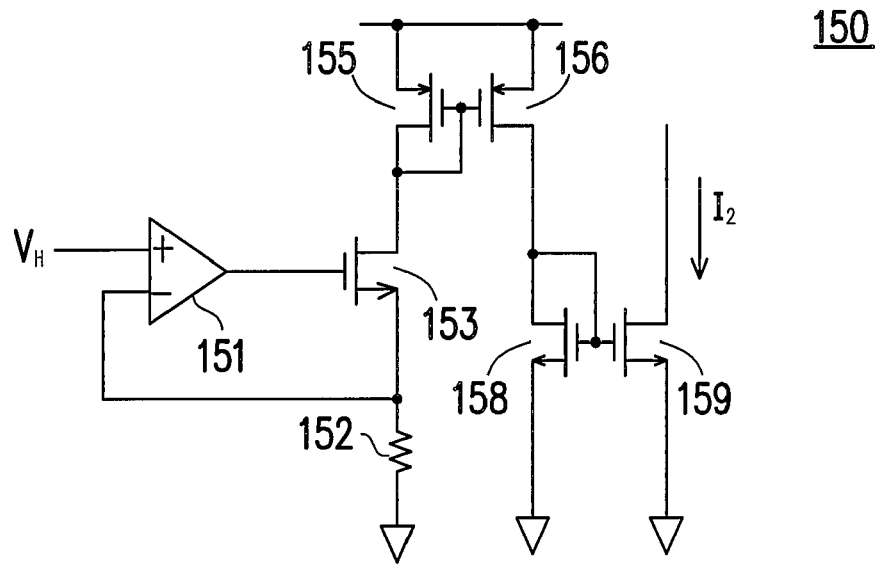
FIG. 4 shows a conversion circuit according to the preferred embodiment of the present invention.

FIG. 4 shows the conversion circuit 150 for converting the voltage $V_H$ to the second signal $I_2$ according to the preferred embodiment of the present invention. An operational amplifier 151, a transistor 153, and a resistor 152 form a voltage-to-current circuit to generate a current $I_{153}$ in response to the voltage $V_H$. A plurality of transistors 155 and 156 produce a current $I_{156}$ in response to the current $I_{153}$. A plurality of transistors 158 and 159 further generate the second signal $I_2$ in response to the current $I_{156}$.

Figure 5:
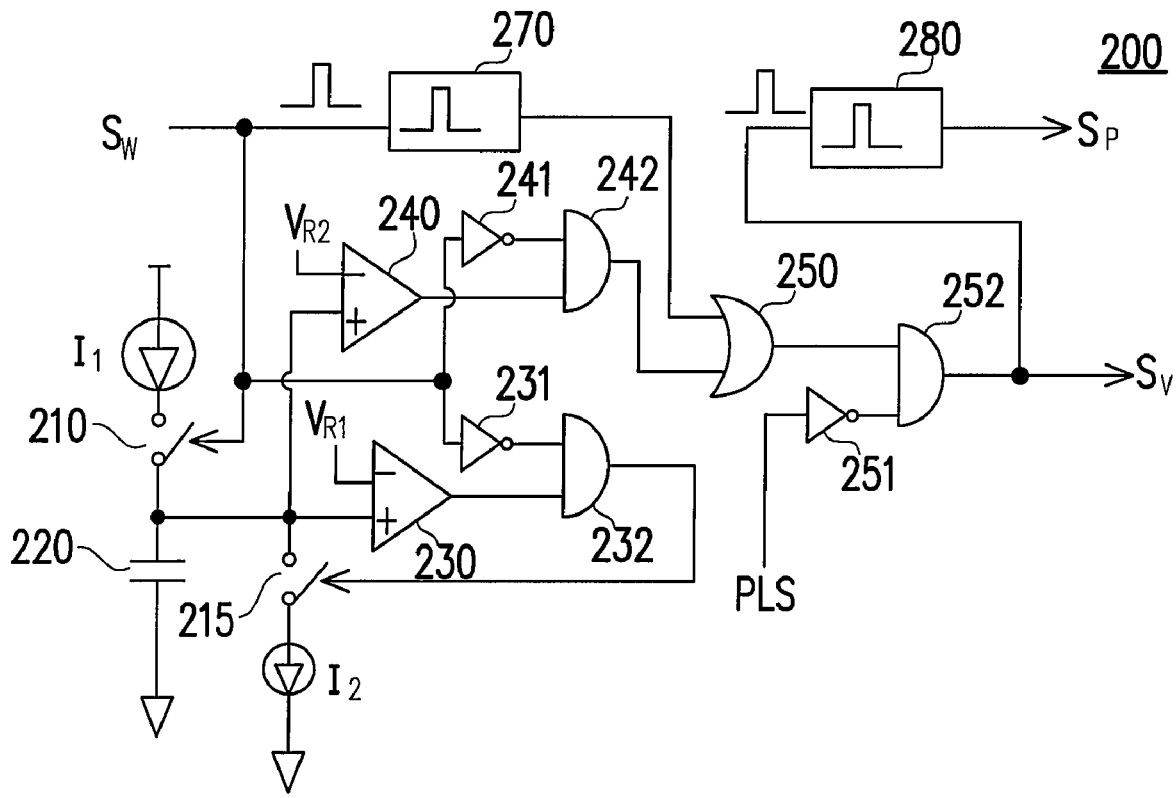
FIG. 5 shows a signal-generation circuit according to the preferred embodiment of the present invention.

FIG. 5 shows the signal-generation circuit 200 according to the preferred embodiment of the present invention. A capacitor 220 is utilized to determine the period of the sample signal $S_W$. A switch 210 is coupled in between the first signal $I_1$ and the capacitor 220. A switch 215 is coupled in between the second signal $I_2$ and the capacitor 220. A comparator 230 is coupled to the capacitor 220 to generate a first-control signal at the output of the comparator 230 once the voltage of the capacitor 220 is higher than a first reference voltage $V_{R1}$. An output circuit formed by an inverter 231 and an AND gate 232 is coupled to generate a first discharge signal at the output of the AND gate 232 in response to the enabling of the first-control signal and the disabling of the switching signal $S_W$. The switching signal $S_W$ is coupled to control the switch 210. The switch 210 is turned on in response to enabling of the switching signal $S_W$. The first discharge signal is coupled to control the switch 215. The switch 215 is turned on in response to the enabling of the first discharge signal. The first signal $I_1$ is used for charging the capacitor 220. The second signal $I_2$ is utilized to discharge the capacitor 220.

The magnetized voltage determines the first signal $I_1$ of the capacitor 220. It can be expressed as, $$I_1 = k1 \times \frac{V_{IN}}{R_\alpha} \qquad (10)$$

The demagnetized voltage determines the second signal $I_2$ of the capacitor 220. It is shown as, $$I_2 = k2 \times \frac{V_X}{R_{152}} \qquad (11)$$

The voltage on the capacitor 220 can be expressed as, $$V_C = \frac{I_1}{C} \times T_{ON} = \frac{k1 \times V_{IN}}{C} \times T_{ON} \qquad (12)$$

where k1 and k2 are constants such as the ratio of resistive devices and/or the gain of current mirror, C is the capacitance of the capacitor 220, $T_{ON}$ is the enable time of the switching signal $S_W$ (the charge time of the capacitor 220), $R_\alpha$ is the resistance of the conversion circuit 140, and $R_{152}$ is resistance of the resistor 152. The discharge time $T_{OFF}$ of the capacitor 220 is given by, $$T_{OFF} = \frac{C \times V_C}{I_2} = \frac{C \times V_C}{K2 \times \frac{V_X}{R_{152}}} \qquad (13)$$

The feedback voltage $V_X$ is correlated to the output voltage $V_O$ of the power converter. According to equations (12) and (13), the discharge time $T_{OFF}$ of the capacitor 220 is corresponded to the demagnetization period $T_{DISCHARGE}$ of the transformer 10 as given by, $$T_{OFF} = K \times \frac{V_{IN}}{V_O} \times T_{ON} \qquad (14)$$

$$T_{DISCHARGE} = K \times \frac{V_{IN}}{V_O} \times T_{CHARGE} \qquad (15)$$

where k is a constant.

A comparator 240 is coupled to the capacitor 220 to generate a second-control signal at the output of the comparator 240 once the voltage of the capacitor 220 is higher than a second reference voltage $V_{R2}$. Another output circuit formed by an inverter 241 and an AND gate 242 is coupled to generate a second discharge signal at the output of the AND gate 242 in response to the enabling of the second-control signal and the disabling of the switching signal $S_W$. The sample signal $S_V$ can be generated in accordance with the first discharge signal or the second discharge signal. The second discharge signal is utilized to generate the sample signal $S_V$ in this preferred embodiment. Referring to the equation (15), the period of the sample signal $S_V$ is equal to the demagnetization period $T_{DISCHARGE}$ that is increased in response to the increase of the magnetized voltage ($V_{IN}$). The period of the sample signal $S_V$ is decreased in response to the decrease of the magnetization period $T_{CHARGE}$ of the transformer. The period of the sample signal $S_V$ is decreased in response to the increase of the demagnetized voltage ($V_O$). The magnetization period $T_{CHARGE}$ is correlated to the enable time of the switching signal $S_W$.

The second discharge signal is further connected to an input of an OR gate 250. Another input of the OR gate 250 is connected to the output of a one-shot circuit 270. The input of the one-shot circuit 270 is connected to the switching signal $S_W$. The output of the OR gate 250 is connected to an input of an AND gate 252. Another input of the AND gate 252 is connected to the pulse signal PLS through an inverter 251. The output of the AND gate 252 generates the sample signal $S_V$. Because the pulse signal PLS is used to enable the switching signal $S_W$, the sample signal $S_V$ is disabled before the enabling of the switching signal $S_W$. Another one-shot circuit 280 is further coupled to the output of the AND gate 252 to generate the strobe signal $S_P$ in response to the disabling of the sample signal $S_V$. Therefore, the sample signal $S_V$ is generated in response to the disabling of the switching signal $S_W$, in which the one-shot circuit 270 is used for determining the minimum pulse width of the sample signal $S_V$.

Figure 6:
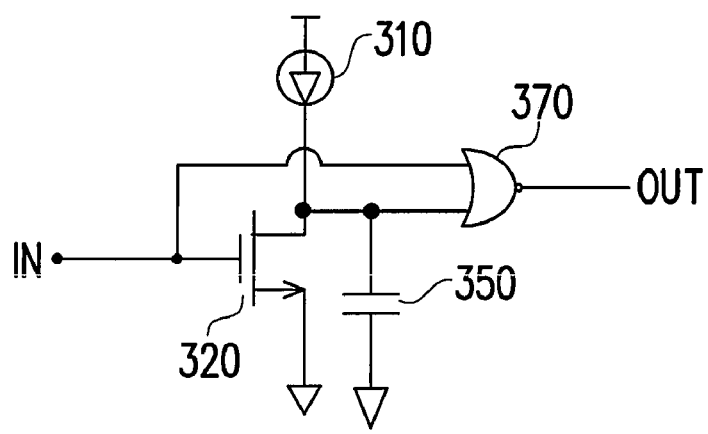
FIG. 6 shows the schematic of a one-shot circuit according to the preferred embodiment of the present invention.
Figure 7:
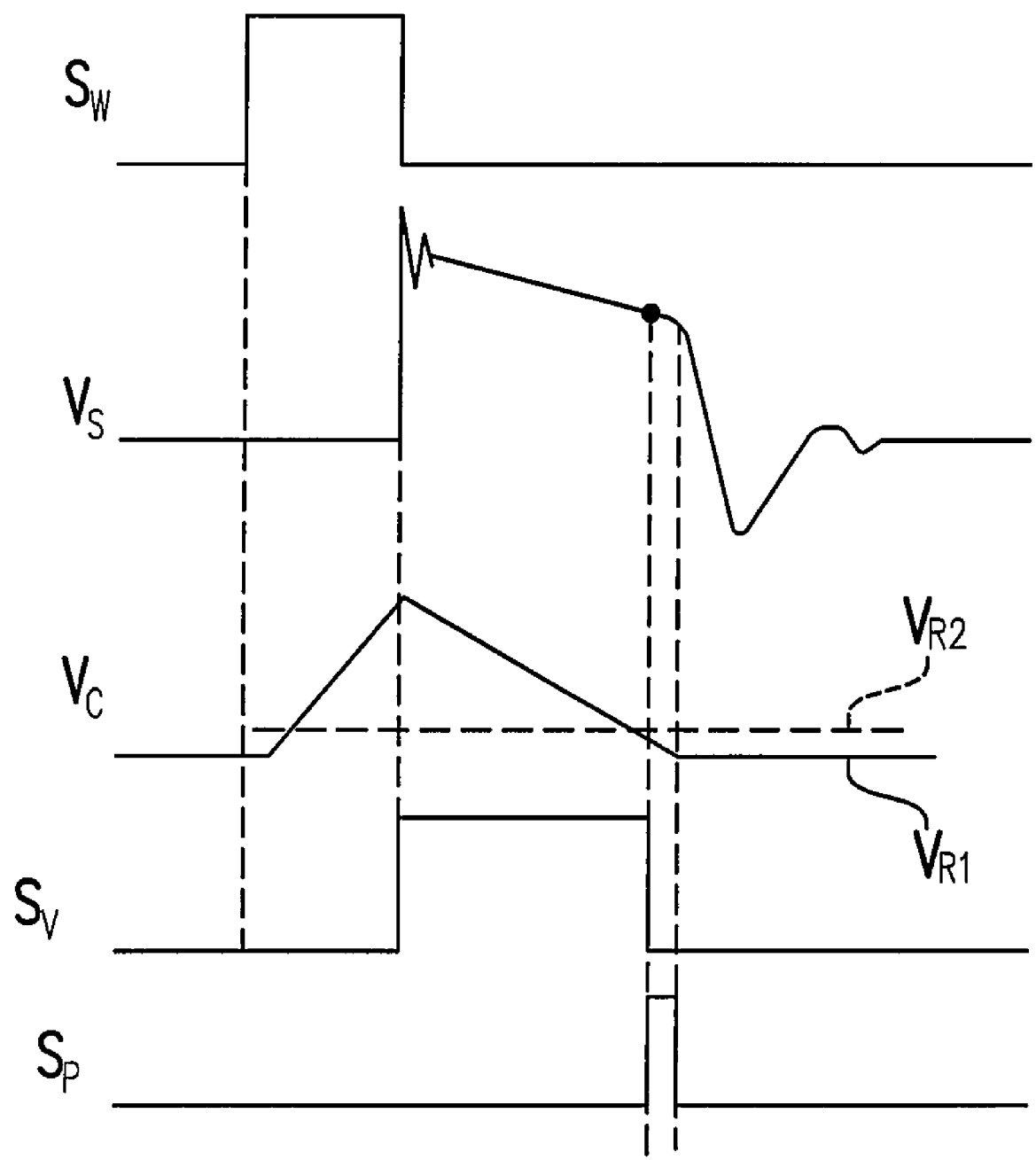
FIG. 7 shows a plurality of waveforms of the linear-predict sampling circuit, according to the preferred embodiment of the present invention.

FIG. 6 shows the one-shot circuit such as the one-shot circuits 270, 280. A constant current source 310 is used for charging a capacitor 350 once a transistor 320 is turned off. The input terminal IN of the one-shot circuit is connected to the gate of the transistor 320 and the input of an NOR gate 370. Another input of the NOR gate 370 is connected to the capacitor 350. Therefore, the one-shot circuit generates a one-shot signal OUT at the output of the NOR gate 370 in response to the falling edge of the input signal of the one-shot circuit. The current of the constant current source 310 and the capacitance of the capacitor 350 determine the pulse width of the one-shot signal OUT. FIG. 7 shows the sample signal $S_V$ and the strobe signal $S_P$ in response to the voltage $V_C$ of the capacitor 220 and the waveform of the demagnetized voltage at the VS terminal. The demagnetized voltage is sampled once the transformer 10 is fully demagnetized.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A linear-predict sampling circuit of a power converter, comprising:

a signal-generation circuit, generating a sample signal in response to a first signal, a second signal, and a switching signal, wherein the first signal is correlated to a magnetized voltage of a transformer, and the second signal is correlated to a demagnetized voltage of the transformer; and a sample-and-hold circuit, coupled to the transformer to generate a feedback signal by sampling the demagnetized voltage of the transformer in response to the sample signal, wherein the feedback signal is correlated to the output voltage of the power converter, and the switching signal is generated in response to the feedback signal for switching the transformer and regulating the output of the power converter.

2. The linear-predict sampling circuit as claimed in claim 1, wherein the period of the sample signal is increased in response to the increase of the magnetized voltage, the period of the sample signal is decreased in response to the decrease of the magnetization period of the transformer, the period of the sample signal is decreased in response to the increase of the demagnetized voltage, and wherein the magnetization period of the transformer is correlated to the enable time of the switching signal.

3. The linear-predict sampling circuit as claimed in claim 1, wherein the demagnetized voltage is sampled once the transformer is demagnetized.

4. The linear-predict sampling circuit as claimed in claim 1, in which a minimum value of the second signal is clamped to a limit value.

5. The linear-predict sampling circuit as claimed in claim 1, wherein the signal-generation circuit, comprising:
　a capacitor;
　a first switch coupled in between the first signal and the capacitor;
　a second switch coupled in between the second signal and the capacitor;
　a first comparator coupled to the capacitor to generate a first-control signal once the voltage of the capacitor is higher than a first reference voltage;
　an output circuit coupled to generate a first discharge signal in response to the enabling of the first-control signal and the disabling of the switching signal, wherein the first switch is turned on in response to enabling of the switching signal, and the second switch is turned on in response to the enabling of the first discharge signal, wherein the first signal is used for charging the capacitor, and the second signal is utilized for discharging the capacitor.

6. The linear-predict sampling circuit as claimed in claim 5, wherein the signal-generation circuit further comprising a second comparator coupled to the capacitor to generate a second discharge signal once the voltage of the capacitor is higher than a second reference voltage, and
　wherein the sample signal is generated according to the first discharge signal or the second discharge signal.

7. The linear-predict sampling circuit as claimed in claim 5, wherein the signal-generation circuit further comprising a one-shot pulse generator to generate a strobe signal in response to the disabling of the sample signal.

8. The linear-predict sampling circuit as claimed in claim 1, wherein the sample signal having a minimum pulse width is generated in response to the disabling of the switching signal.

9. The linear-predict sampling circuit as claimed in claim 1, wherein the sample signal is disabled before the enabling of the switching signal.

10. The linear-predict sampling circuit as claimed in claim 1, wherein the sample-and-hold circuit comprising:
　a first capacitor;
　a second capacitor for generating the feedback signal;
　a first switch for sampling the demagnetized voltage of the transformer to the first capacitor in response to the sample signal; and
　a second switch coupled to the first capacitor to sample the voltage of the first capacitor to the second capacitor in response to the strobe signal.

11. A linear-predict sampling apparatus of the power converter, comprising:
　a signal-generation circuit generating a sample signal in response to a magnetized voltage of a transformer and the magnetization period of the transformer; and
　a sample-and-hold circuit coupled to the transformer to generate a signal by sampling the demagnetized voltage of the transformer in response the sample signal,
　wherein the signal is correlated to the output voltage of the power converter.

12. The linear-predict sampling apparatus as claimed in claim 11, wherein a demagnetized voltage of the transformer further determines the period of the sample signal.

13. The linear-predict sampling apparatus as claimed in claim 11, wherein the period of the sample signal is increased in response to the increase of the magnetized voltage, the period of the sample signal is decreased in response to the decrease of the magnetization period of the transformer, and the period of the sample signal is decreased in response to the increase of the demagnetized voltage.

14. The linear-predict sampling apparatus as claimed in claim 11, wherein the sample-and-hold circuit samples the demagnetized voltage after the transformer is demagnetized.

15. The linear-predict sampling apparatus as claimed in claim 11, wherein the sample-and-hold circuit, comprising:
　a first capacitor;
　a second capacitor for generating the signal;
　a first switch coupled to sample the demagnetized voltage of the transformer to the first capacitor in response to the sample signal; and
　a second switch coupled to the first capacitor to sample the voltage of the first capacitor to the second capacitor in response to the disabling of the sample signal.

* * * * *